(12) United States Patent
Nakamura et al.

(10) Patent No.: US 11,695,892 B2
(45) Date of Patent: Jul. 4, 2023

(54) READING DEVICE AND METHOD OF DETECTING FEATURE AMOUNT FROM VISIBLE OR INVISIBLE IMAGE

(71) Applicants: Shogo Nakamura, Kanagawa (JP);
Ayumu Hashimoto, Kanagawa (JP);
Masamoto Nakazawa, Kanagawa (JP);
Tadaaki Oyama, Kanagawa (JP)

(72) Inventors: Shogo Nakamura, Kanagawa (JP);
Ayumu Hashimoto, Kanagawa (JP);
Masamoto Nakazawa, Kanagawa (JP);
Tadaaki Oyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 137 days.

(21) Appl. No.: 17/161,704

(22) Filed: Jan. 29, 2021

(65) Prior Publication Data

US 2021/0281712 A1    Sep. 9, 2021

(30) Foreign Application Priority Data

Mar. 5, 2020    (JP) ................................. 2020-038264

(51) Int. Cl.
*H04N 1/387*    (2006.01)
*H04N 1/00*    (2006.01)

(52) U.S. Cl.
CPC ......... *H04N 1/3878* (2013.01); *H04N 1/0075* (2013.01); *H04N 1/00737* (2013.01); *H04N 1/00748* (2013.01); *H04N 1/00755* (2013.01)

(58) Field of Classification Search
CPC ............. H04N 1/3878; H04N 1/00737; H04N 1/00748; H04N 1/0075; H04N 1/00755
(Continued)

(56) References Cited

U.S. PATENT DOCUMENTS

| | | | |
|---|---|---|---|
| 2006/0072171 A1* | 4/2006 | Nystrom | H04N 1/00702 358/514 |
| 2007/0188638 A1 | 8/2007 | Nakazawa et al. | |

(Continued)

FOREIGN PATENT DOCUMENTS

| | | |
|---|---|---|
| EP | 2 706 511 A1 | 3/2014 |
| EP | 3 609 171 A1 | 2/2020 |

(Continued)

OTHER PUBLICATIONS

U.S. Appl. No. 16/911,406, filed Jun. 25, 2020, Ayumu Hashimoto, et al.

(Continued)

*Primary Examiner* — Gabriel I Garcia
(74) *Attorney, Agent, or Firm* — Xsensus LLP

(57) ABSTRACT

A reading device includes a light source, an image sensor, a background board, and an image processing circuitry. The light source irradiates visible light and invisible light to a subject. The image sensor receives the visible light and the invisible light, each of which is reflected from the subject, to capture a visible image and an invisible image. The background board is provided in an image capturing range of the image sensor. The background board is a background portion. The image processing circuitry detects a feature amount of the subject and the background portion from at least one of the visible image and the invisible image.

19 Claims, 18 Drawing Sheets

(58) Field of Classification Search
USPC .................................................... 382/289
See application file for complete search history.

(56) References Cited

U.S. PATENT DOCUMENTS

| | | |
|---|---|---|
| 2008/0252787 A1 | 10/2008 | Nakazawa et al. |
| 2010/0027061 A1 | 2/2010 | Nakazawa |
| 2010/0171998 A1 | 7/2010 | Nakazawa |
| 2011/0026083 A1 | 2/2011 | Nakazawa |
| 2011/0051201 A1 | 3/2011 | Hashimoto et al. |
| 2011/0063488 A1 | 3/2011 | Nakazawa |
| 2011/0249069 A1 | 10/2011 | Oyama |
| 2012/0224205 A1 | 9/2012 | Nakazawa |
| 2012/0236373 A1 | 9/2012 | Oyama |
| 2013/0063792 A1 | 3/2013 | Nakazawa |
| 2014/0029065 A1 | 1/2014 | Nakazawa |
| 2014/0204427 A1 | 7/2014 | Nakazawa |
| 2014/0204432 A1 | 7/2014 | Hashimoto et al. |
| 2014/0211273 A1 | 7/2014 | Konno et al. |
| 2014/0368893 A1 | 12/2014 | Nakazawa et al. |
| 2015/0098117 A1 | 4/2015 | Marumoto et al. |
| 2015/0116794 A1 | 4/2015 | Nakazawa |
| 2015/0163378 A1 | 6/2015 | Konno et al. |
| 2015/0222790 A1 | 8/2015 | Asaba et al. |
| 2015/0249762 A1 | 9/2015 | Ishida et al. |
| 2015/0304517 A1 | 10/2015 | Nakazawa et al. |
| 2016/0003673 A1 | 1/2016 | Hashimoto et al. |
| 2016/0006961 A1 | 1/2016 | Asaba et al. |
| 2016/0028920 A1 | 1/2016 | Hashimoto |
| 2016/0088179 A1 | 3/2016 | Nakazawa et al. |
| 2016/0112660 A1 | 4/2016 | Nakazawa et al. |
| 2016/0119495 A1 | 4/2016 | Konno et al. |
| 2016/0173719 A1 | 6/2016 | Hashimoto et al. |
| 2016/0221778 A1* | 8/2016 | Ueda ..................... B65H 9/002 |
| 2016/0268330 A1 | 9/2016 | Nakazawa et al. |
| 2016/0295138 A1 | 10/2016 | Asaba et al. |
| 2016/0373604 A1 | 12/2016 | Hashimoto et al. |
| 2017/0019567 A1 | 1/2017 | Konno et al. |
| 2017/0163836 A1 | 6/2017 | Nakazawa |
| 2017/0170225 A1 | 6/2017 | Asaba et al. |
| 2017/0201700 A1 | 7/2017 | Hashimoto et al. |
| 2017/0244853 A1 | 8/2017 | Yabuuchi et al. |
| 2017/0264782 A1 | 9/2017 | Hashimoto |
| 2017/0295298 A1 | 10/2017 | Ozaki et al. |
| 2017/0302821 A1 | 10/2017 | Sasa et al. |
| 2017/0324883 A1 | 11/2017 | Konno et al. |
| 2018/0139345 A1 | 5/2018 | Goh et al. |
| 2018/0146150 A1 | 5/2018 | Shirado et al. |
| 2018/0175096 A1 | 6/2018 | Inoue et al. |
| 2018/0213124 A1 | 7/2018 | Takuhei et al. |
| 2018/0261642 A1 | 9/2018 | Asaba et al. |
| 2019/0163112 A1 | 5/2019 | Nikaku et al. |
| 2019/0208149 A1 | 7/2019 | Asaba et al. |
| 2019/0238702 A1 | 8/2019 | Ikemoto et al. |
| 2019/0268496 A1 | 8/2019 | Nakazawa et al. |
| 2019/0289163 A1 | 9/2019 | Hashimoto et al. |
| 2019/0327387 A1 | 10/2019 | Hashimoto et al. |
| 2019/0335061 A1 | 10/2019 | Nakazawa et al. |
| 2020/0053229 A1 | 2/2020 | Hashimoto et al. |
| 2020/0053230 A1 | 2/2020 | Nakazawa et al. |
| 2020/0053233 A1 | 2/2020 | Nakazawa et al. |
| 2020/0077010 A1* | 3/2020 | Noguchi ............... H04N 5/2354 |
| 2020/0120224 A1 | 4/2020 | Sasa et al. |
| 2020/0120225 A1 | 4/2020 | Oyama et al. |
| 2020/0120228 A1 | 4/2020 | Ozaki et al. |
| 2020/0137262 A1 | 4/2020 | Kubo et al. |
| 2020/0244837 A1 | 7/2020 | Tsukahara et al. |
| 2020/0252513 A1 | 8/2020 | Nakada et al. |
| 2020/0296255 A1 | 9/2020 | Hashimoto et al. |
| 2020/0336615 A1 | 10/2020 | Ono et al. |
| 2020/0410271 A1 | 12/2020 | Nakazawa et al. |
| 2020/0412904 A1 | 12/2020 | Ohmiya et al. |

FOREIGN PATENT DOCUMENTS

| | | |
|---|---|---|
| JP | 2014-053739 | 3/2014 |
| WO | 2016/018395 A1 | 2/2016 |

OTHER PUBLICATIONS

U.S. Appl. No. 16/925,39, filed Jul. 10, 2020, Yutaka Ohmiya, et al.
Extended European Search Report dated Jul. 19, 2021 in European Patent Application No. 21159319.9, 8 pages.

* cited by examiner

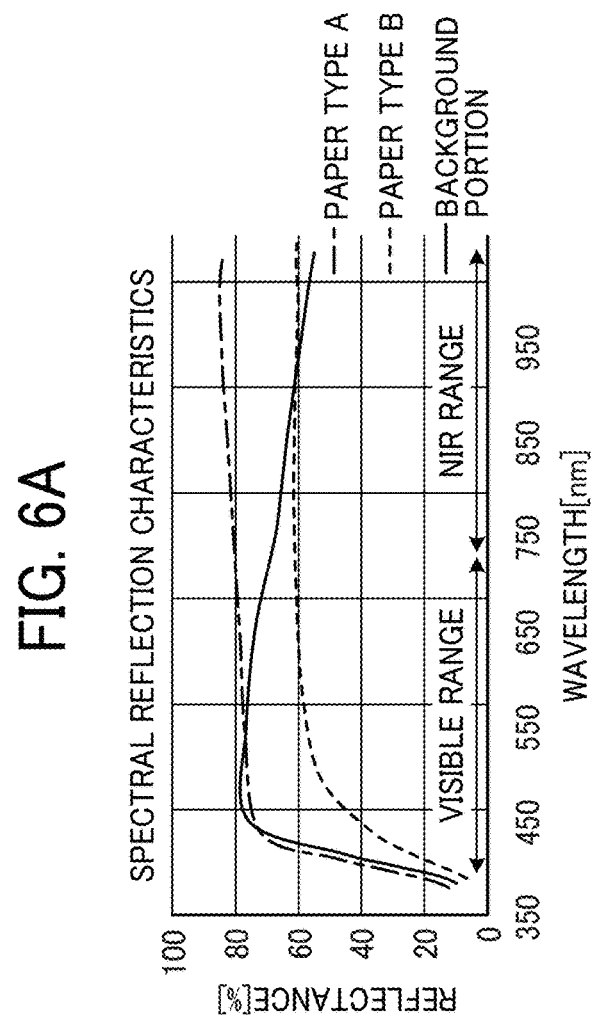
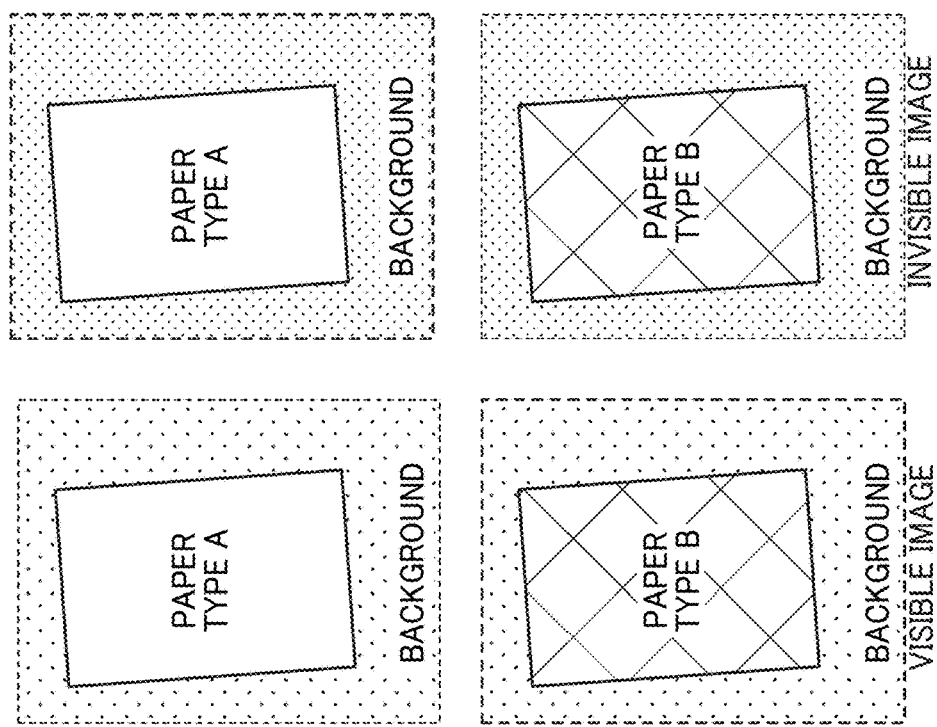

FIG. 9A
PARTS OF BACKGROUND
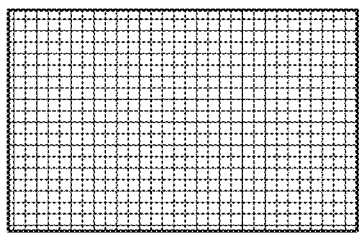
FIG. 9B
GRID PATTERN
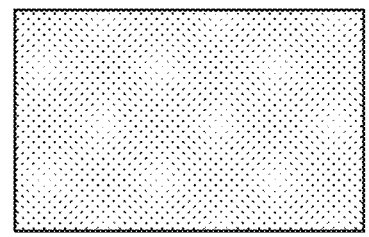
FIG. 9C
DISCRETE PATTERN
FIG. 10
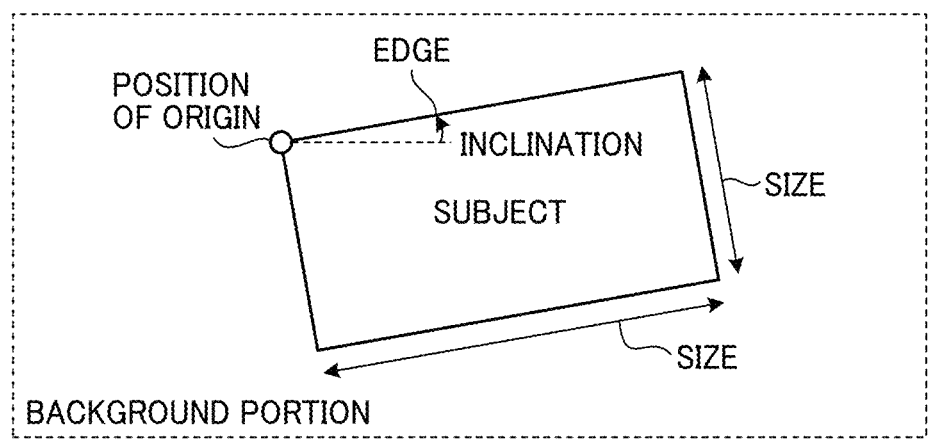

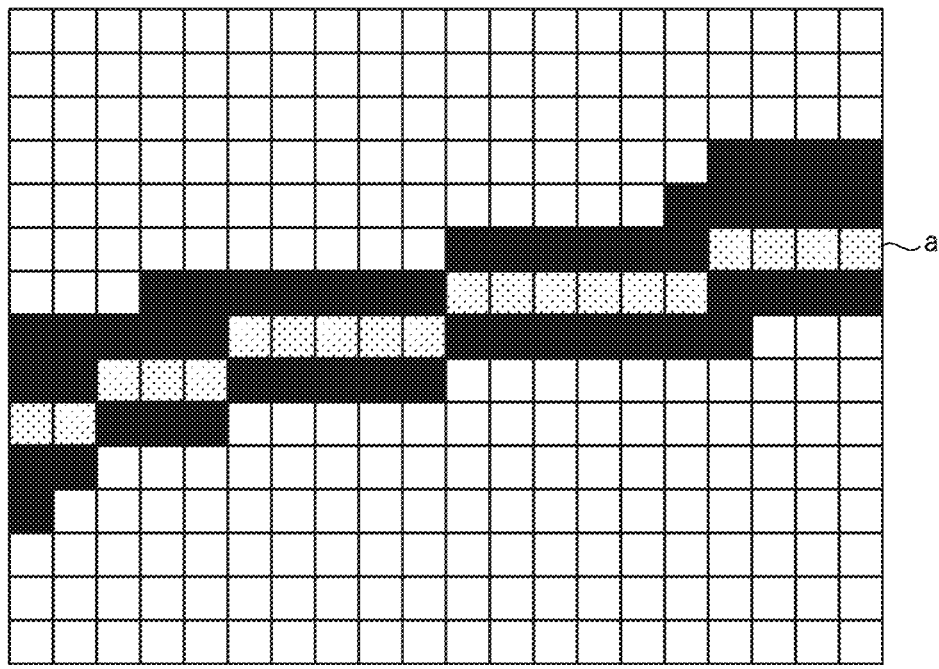

VISIBLE IMAGE

INVISIBLE IMAGE

EDGE OR IMAGE

VISIBLE IMAGE

INVISIBLE IMAGE

VISIBLE IMAGE BEFORE CORRECTION

INVISIBLE IMAGE BEFORE CORRECTION

VISIBLE IMAGE AFTER CORRECTION

INVISIBLE IMAGE AFTER CORRECTION

READING DEVICE AND METHOD OF DETECTING FEATURE AMOUNT FROM VISIBLE OR INVISIBLE IMAGE

CROSS-REFERENCE TO RELATED APPLICATION

This patent application is based on and claims priority pursuant to 35 U.S.C. § 119(a) to Japanese Patent Application No. 2020-038264, filed on Mar. 5, 2020, in the Japan Patent Office, the entire disclosure of which is hereby incorporated by reference herein.

BACKGROUND

Technical Field

Embodiments of the present disclosure relate to a reading device, an image processing apparatus, a method of detecting a feature amount, and a non-transitory recording medium storing instructions for executing a method of detecting a feature amount.

Related Art

Conventionally, an image processing technique for detecting an edge between a document and a background from an image and correcting an inclination and a position of the document based on the detected edge between the document and the background is known.

There is a known technique in which an infrared light low reflection portion is provided as a background, and an edge between a document and the background is detected based on an acquired infrared image so that the edge between the document and the background is extracted.

SUMMARY

An exemplary embodiment of the present disclosure includes a reading device including a light source, an image sensor, a background board, and an image processing circuitry. The light source irradiates visible light and invisible light to a subject. The image sensor receives the visible light and the invisible light, each of which is reflected from the subject, to capture a visible image and an invisible image. The background board is provided in an image capturing range of the image sensor. The background board is a background portion. The image processing circuitry detects a feature amount of the subject and the background portion from at least one of the visible image and the invisible image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6A to FIG. 6C are diagrams illustrating difference in spectral reflection characteristics between a visible image and an invisible image depending on a paper type, according to one or more embodiments;

FIG. 9A, FIG. 9B, and FIG. 9C are diagrams each illustrating an example of an invisible light low reflection portion, according to one or more embodiments;

FIG. 10 is a diagram illustrating information obtained from one or more edges of a subject, according to one or more embodiments:

FIG. 11A and FIG. 11B are diagrams each illustrating an example of a method of edge detection, according to one or more embodiments;

Figure 1:
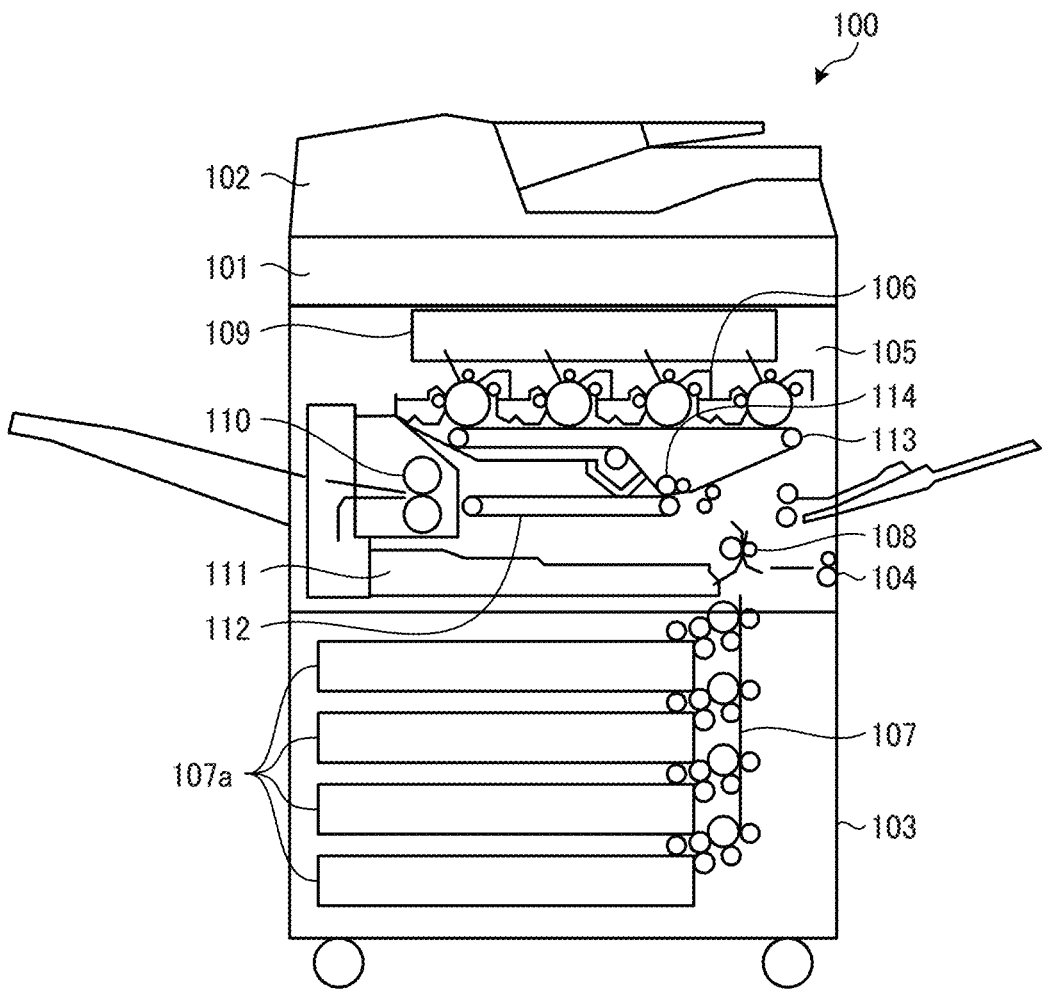
FIG. 1 is a view illustrating an exemplary configuration of an image forming apparatus according to one or more embodiments.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Hereinafter, embodiments of a reading device, an image processing apparatus, and a method of detecting a feature amount are described in detail with reference to the attached drawings.

First Embodiment

FIG. 1 is a view illustrating an exemplary configuration of an image forming apparatus 100 according to a first embodiment of the disclosure. In FIG. 1, the image forming apparatus 100, which serves as an image processing apparatus, is an apparatus generally referred to as a multifunction peripheral (MFP) that has at least two functions among a copy function, a printer function, a scanner function, and a facsimile function.

The image forming apparatus 100 includes an image reading device 101 serving as a reading device, an automatic document feeder (ADF) 102, and an image forming device 103 provided below the image reading device 101. The image forming device 103 is configured to form an image. In order to describe an internal configuration of the image forming device 103. FIG. 1 illustrates the internal configuration of the image forming device 103 from which an external cover is removed.

The ADF 102 is a document supporter that positions, at a reading position, a document including an image to be read. The ADF 102 automatically feeds the document placed on a placement table to the reading position. The image reading device 101 reads the document fed by the ADF 102 at a predetermined reading position. The image reading device 101 has, on a top surface, a contact glass that is the document supporter, on which a document is placed, and reads the document on the contact glass that is at the reading position. Specifically, the image reading device 101 is a scanner including a light source, an optical system, and a solid-state imaging element such as a complementary metal oxide semiconductor (CMOS) image sensor inside, and reads, by the solid-state imaging element through the optical system, reflected light of the document, which is illuminated, or irradiated, by the light source.

The image forming device 103 includes a manual feed roller pair 104 for manually feeding a recording sheet, and a recording sheet supply unit 107 for supplying the recording sheet. The recording sheet supply unit 107 includes a mechanism for feeding out the recording sheet from multi-stage recording paper feed cassettes 107a. The recording sheet thus supplied is sent to a secondary transfer belt 112 via a registration roller pair 108.

A secondary transfer device 114 transfers a toner image from an intermediate transfer belt 113 onto the recording sheet conveyed on the secondary transfer belt 112.

The image forming device 103 also includes an optical writing device 109, an image forming unit (for yellow (Y), magenta (M), cyan (C), and black (K)) 105 employing a tandem system, the intermediate transfer belt 113, and the secondary transfer belt 112. Specifically, in an image forming process, the image forming unit 105 renders an image written by the optical writing device 109 as a toner image and forms the toner image on the intermediate transfer belt 113.

Specifically, the image forming unit (for Y, M, C, and K) 105 includes four photoconductor drums (Y, M, C, and K) in a rotatable manner, and image forming elements 106 each including a charging roller, a developing device, a primary transfer roller, a cleaner unit, and a static eliminator around the respective photoconductor drums. The image forming element 106 functions on each photoconductor drum, and the image on the photoconductor drum is transferred onto the intermediate transfer belt 113 by each primary transfer roller.

The intermediate transfer belt 113 is arranged to be stretched by a drive roller and a driven roller at a nip between each photoconductor drum and each primary transfer roller. The toner image primarily transferred onto the intermediate transfer belt 113 is secondarily transferred onto the recording sheet on the secondary transfer belt 112 by a secondary transfer device as the intermediate transfer belt 113 runs. The recording sheet is conveyed to a fixing device 110 as the secondary transfer belt 112 runs, and the toner image is fixed as a color image on the recording sheet. Finally, the recording sheet is discharged onto an output tray disposed outside a housing of the image forming apparatus 100. Note that, in a case of duplex printing, a reverse assembly 111 reverses the front and back sides of the recording sheet and sends out the reversed recording sheet onto the secondary transfer belt 112.

The image forming device 103 is not limited to the one that forms an image by an electrophotographic method as described above. The image forming device 103 may be one that forms an image by an inkjet method.

Next, a description is given of the image reading device 101.

Figure 2:
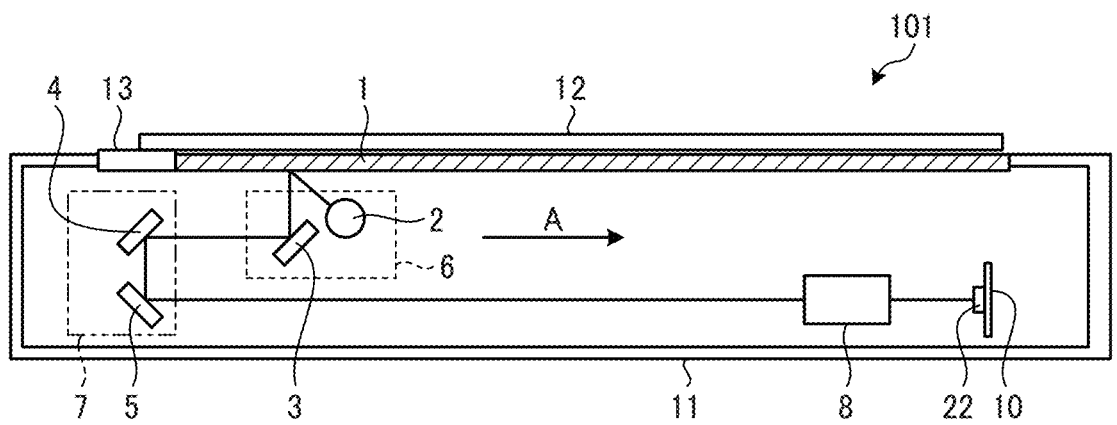
FIG. 2 is a cross-sectional view exemplarily illustrating a structure of an image reading device according to one or more embodiments.

FIG. 2 is a cross-sectional view exemplarily illustrating a structure of the image reading device 101 according to the present embodiment. As illustrated in FIG. 2, the image reading device 101 includes, in a housing 11, a sensor substrate 10 provided with an imaging unit (image sensor)

22, which is a solid-state imaging element, a lens unit 8, a first carriage 6, and a second carriage 7. The first carriage 6 includes a light source 2, which is a light emitting diode (LED), and a mirror 3. The second carriage 7 includes mirrors 4 and 5. Further, the image reading device 101 is provided with a contact glass 1 on an upper surface.

The light source 2 is configured as a light source for visible/invisible light. In the description, the invisible light is light having a wavelength equal to or less than 380 nm or equal to or more than 750 nm. That is, the light source 2 is an illumination unit that irradiates a subject and a background portion 13 with the visible light and the invisible light (for example, near infrared (NIR) light).

Further, the image reading device 101 is provided with the background portion 13 that is a reference white board, on the upper surface. Hereinafter, the background portion 13 may be referred to as a background board 13. More specifically, the background portion 13 is provided on an opposite side to the light source 2, which is the illumination unit, with respect to the subject, in an image capturing range of the imaging unit 22.

In a reading operation, the image reading device 101 irradiates light upward from the light source 2 while moving the first carriage 6 and the second carriage 7 from a standby position (home position) in a sub-scanning direction (direction A). The first carriage 6 and the second carriage 7 cause reflected light from a document 12, which is the subject, to be imaged on the imaging unit 22 via the lens unit 8.

Further, when the power is turned on, the image reading device 101 reads reflected light from the reference w % bite board (background board) 13 to set a reference. That is, the image reading device 101 moves the first carriage 6 directly below the reference white board (background board) 13, turns on the light source 2, and causes the reflected light from the reference white board 13 to be imaged on the imaging unit 22, thereby performing a gain adjustment.

The imaging unit 22 images visible and invisible wavelength ranges. In the imaging unit 22, pixels that convert incident light level into electric signals are arranged. The pixels are arranged in a matrix, and the electric signals each of which is obtained from corresponding one of the pixels are transferred to a signal processing unit 222, which is arranged in a subsequent stage (see FIG. 3), in a predetermined order at regular time intervals (pixel reading signal). A color filter that transmits light limited to having a specific wavelength is arranged on each pixel. In the imaging unit 22 according to the present embodiment, each signal obtained from a pixel group in which the same color filter is arranged is referred to as a channel. In addition, in the present embodiment, an image captured by the imaging unit 22 by irradiating visible light is referred to as a visible image, and an image captured by the imaging unit 22 by irradiating invisible light such as near infrared light is referred to as an invisible image.

Although an image reading device of a reduction optical system is applied as the image reading device 101 of the present embodiment, no limitation is intended thereby. Alternatively, an equal magnification optical system (contact optical system: contact image sensor (CIS) type) may be used, for example.

Figure 3:
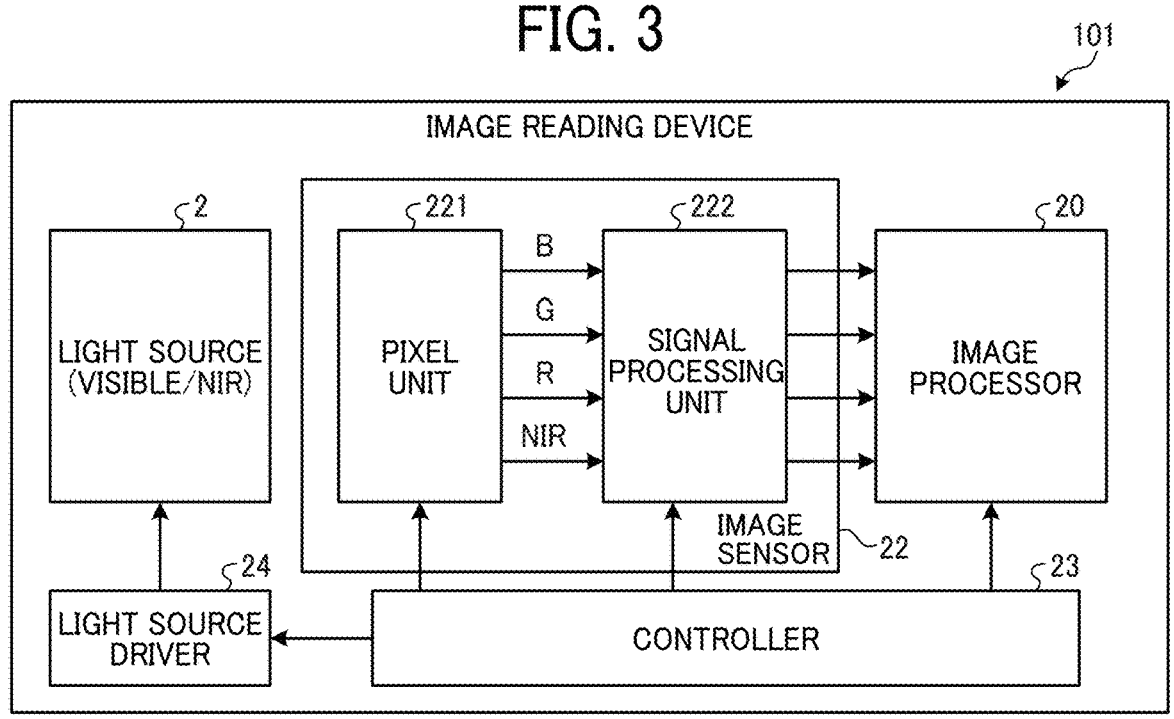
FIG. 3 is a block diagram illustrating electrical connections of components of an image reading device according to one or more embodiments.

FIG. 3 is a block diagram illustrating electrical connections of components of the image reading device 101 according to the present embodiment of the present disclosure. In addition to the imaging unit (image sensor) 22 and the light source 2 described above, the image reading device 101 includes an image processor 20, a controller 23, and a light source driver 24 as illustrated in FIG. 3. The controller 23, which may be implemented by a processor such as a CPU that operates according a program stored in a memory, controls the imaging unit 22, the image processor 20, and the light source driver 24. The light source driver 24 drives the light source 2 under control of the controller 23.

The imaging unit 22 is a sensor for a reduction optical system, such as a CMOS image sensor, for example. The imaging unit 22 includes a pixel unit 221 and the signal processing unit 222.

In the present embodiment, the imaging unit 22 is described as having a four-line configuration as an example, but the configuration is not limited to the four-line configuration. In addition, a circuit configuration in a subsequent stage of the pixel unit 221 is not limited to the configuration illustrated in FIG. 3.

The pixel unit 221 has pixel groups corresponding to four lines, in each of which a plurality of pixel circuits each being configured as a pixel is arranged in a matrix. The signal processing unit 222 processes a signal output from the pixel unit 221 as appropriate and transfers the signal to the image processor 20 arranged in a subsequent stage.

The image processor 20 performs various types of image processing on image data according to a purpose of use.

Figure 4:
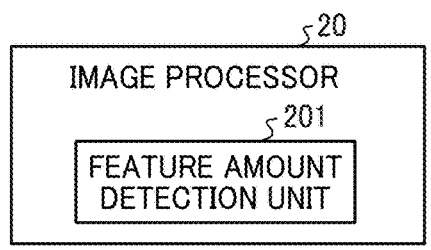
FIG. 4 is a block diagram illustrating an example of a functional configuration of an image processor according to one or more embodiments.

FIG. 4 is a block diagram illustrating a functional configuration of the image processor 20, according to the present embodiment of the disclosure. As illustrated in FIG. 4, the image processor 20 includes a feature amount detection unit 201.

The feature amount detection unit 201 detects a feature amount of the document 12, which is the subject, with respect to the visible image or the invisible image obtained by the imaging unit 22.

Figure 5:
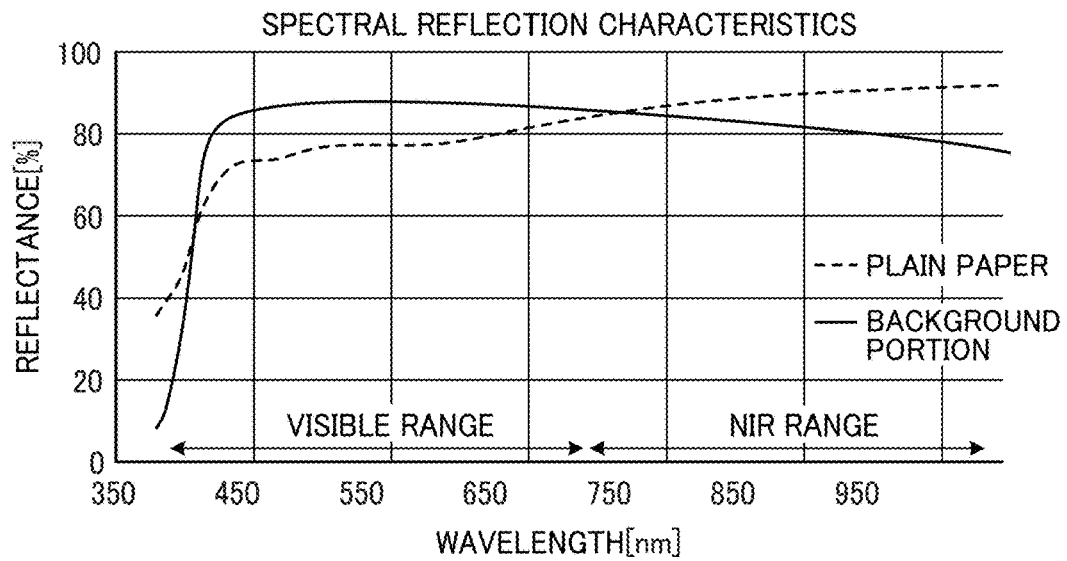
FIG. 5 is a diagram illustrating difference in spectral reflection characteristics depending on a medium in detection of a feature amount of a subject, according to one or more embodiments.

FIG. 5 is a diagram illustrating difference in spectral reflection characteristics depending on a medium in detection of the feature amount of the subject, according to the present embodiment. When the imaging unit 22 reads the reflected light from the document 12, which is the subject, the spectral reflection characteristics of the background portion 13 is different from the spectral reflection characteristics of the document 12, which is the subject, in general. In the example illustrated in FIG. 5, the background portion 13 is downward to the right, and the document 12, which is the subject, is upward to the right. That is, an image obtained with the visible light has a feature different from an image obtained with the invisible light. Accordingly, the feature amount detection unit 201 sets to one of the visible image and the invisible image as an image to be detected (detection target) in advance, according to a type of the document 12, which is the subject, and a type of the background portion 13. This allows the feature amount detection unit 201 to easily obtain a targeted feature amount.

FIG. 6A to FIG. 6C are diagrams illustrating difference in spectral reflection characteristics between the visible image and the invisible image depending on a paper type, according to the present embodiment of the disclosure. For example, according to the example illustrated in FIG. 6A, FIG. 6B, and FIG. 6C, when the visible image and the invisible image are compared with respect to a paper type A, the invisible image has larger difference in the spectral reflection characteristics from the background portion 13 than the visible image. Accordingly, in the case of the paper type A, the feature amount detection unit 201 sets the invisible image as the detection target for the feature amount. On the other hand, when comparing the visible image and the invisible image with respect to a paper type B, the visible image has larger difference in the spectral reflection characteristics from the background portion 13 than the invisible image. Accordingly, in the case of the paper type B, the feature amount detection unit 201 sets the visible image as the detection target for the feature amount.

A description is given below of selecting a visible component as an extraction target for the feature amount.

Figure 7:
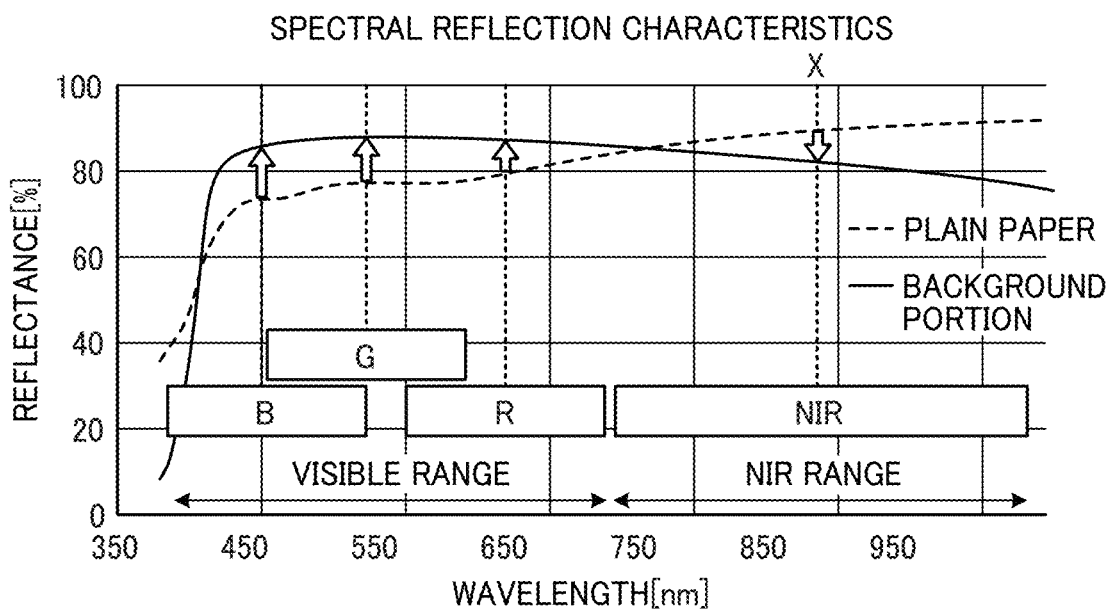
FIG. 7 is a diagram illustrating an example in selecting a visible component as an extraction target for a feature amount, according to one or more embodiments.

FIG. 7 is a diagram illustrating an example in selecting a visible component as an extraction target for the feature amount, according to the present embodiment. The light actually irradiated has a wide wavelength range, but in the example illustrated in FIG. 7, a representative wavelength of each component is represented by a dotted line for simplicity. In addition, as an example, the near infrared light is used as the invisible light.

As illustrated in FIG. 7, when a reflectance of each visible component is compared with a reflectance (arrow X) of a component of the near infrared light in the difference between the background portion 13 and the document 12, which is the subject, a blue (B) component has the largest difference. Accordingly, by using the B component, the feature amount detection unit 201 make a difference in the feature amount between the document 12, which is the subject, and the background portion 13.

That is, the feature amount detection unit 201 compares, with respect to the invisible light and the visible light, the differences in the spectral reflection characteristics between the background portion 13 and the document 12, which is the subject, and the selected visible component as the extraction target for the feature amount includes a component that has the largest difference in the spectral reflection characteristics from the invisible light among the visible light (a plurality of components of the visible light). In general, a feature amount of a green (G) component that has a wide wavelength range is often used from the visible image. However, in the case of the example illustrated in FIG. 7, when the feature amounts in the visible range and the infrared range are used, the difference in the spectral reflection characteristics between the document and the background portion becomes large between the B component and an infrared component, so that edge detection is easier to be performed.

The feature amount detection unit 201 is not limited to extracting, as the feature amount used as a visible component, the one from the B component alone, but the feature amount used as a visible component may include a part, which is a component having the largest component value among the RGB components, for example.

Further, when the document 12, which is the subject, has variations in the spectral reflection characteristics, the feature amount detection unit 201 may determine a visible component to be selected as the extraction target for the feature amount by measuring a representative from the variations of the document 12, which is the subject, or taking an average of measurement results.

A description is given below of a case where the background portion 13 is an invisible light low reflection portion.

Figure 8:
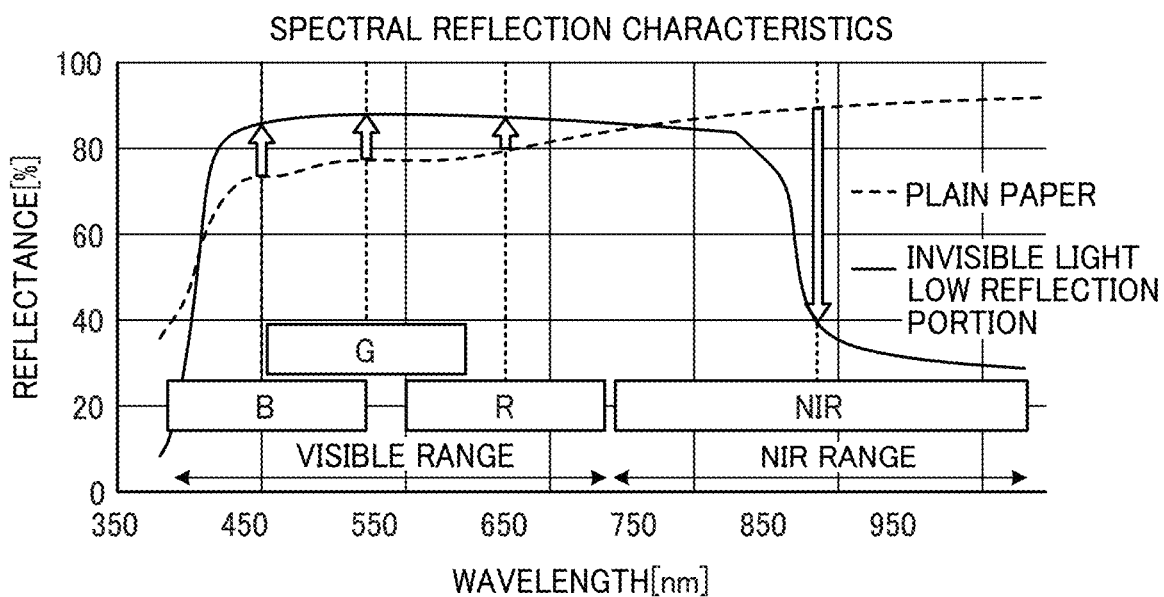
FIG. 8 is a diagram illustrating an example of spectral reflection characteristics when a background portion is an invisible light low reflection portion, according to one or more embodiments.

FIG. 8 is a diagram illustrating an example of spectral reflection characteristics when the background portion 13 is an invisible light low reflection portion, according to the present embodiment. As illustrated in FIG. 8, the background portion 13 may be the invisible light low reflection portion that diffusely reflects the visible light and reflects the invisible light at a reflectance lower than that of the visible light. As a result, a remarkable difference in the spectral reflectance of the background portion 13 occurs between the visible image and the invisible image, thereby making a difference in the spectral reflectance between the document 12, which is the subject, and the background portion 13 as well. This facilitates the feature amount detection unit 201 to extract a targeted feature amount.

FIG. 9A, FIG. 9B, and FIG. 9C are diagrams each illustrating an example of the invisible light low reflection portion, according to the present embodiment. The invisible light low reflection portion may be provided as the whole of the background portion 13 or as a part or a pattern of the background portion 13 as illustrated in FIG. FIG. 9A. FIG. 9B, or FIG. 9C.

As described above, the background portion 13 has the invisible light low reflection portion that diffusely reflects the visible light and reflects the invisible light at a lower reflectance than that of the visible light, and accordingly, there is a remarkable difference in a read value of the background between the visible image and the invisible image, resulting in performing robust edge detection.

A description is given below of a case where the feature amount detection unit 201 extracts an edge of the document 12, which is the subject, as a feature amount.

FIG. 10 is a diagram illustrating information obtained from an edge (one or more edges, one or more edge portions) of the subject, according to the present embodiment. As illustrated in FIG. 10, an edge is a boundary between the document 12, which is the subject, and the background portion 13. By detecting the edge, as illustrated in FIG. 10, a position, an inclination, a size, and the like of the document 12, which is the subject, are recognizable. Then, from the position and the inclination of the document 12, which is the subject, an image may be corrected according to the position or the inclination of the document 12, which is the subject, in a subsequent processing stage.

FIG. 11A and FIG. 11B are diagrams each illustrating an example of a method of the edge detection, according to the present embodiment. As a method of the edge detection, as illustrated in FIG. 11A, for example, a method of applying a first order differential filter to the entire image and binarizing each pixel based on whether a value of each pixel exceeds a predetermined threshold value or not is used. In the above-described method, depending on the threshold value, an edge in a horizontal direction appears as consecutive several pixels with respect to vertical (and vice versa). This is because the edge is blurred mainly due to the modulation transfer function (MTF) characteristics of the optical system. To deal with this, as illustrated in FIG. 11B, in order to take representative edge pixels for calculation of a regression line equation and for size detection, which are described later, for example, there is a method of selecting a central pixel of the consecutive pixels (Part a illustrated in FIG. 11).

Figure 12A:
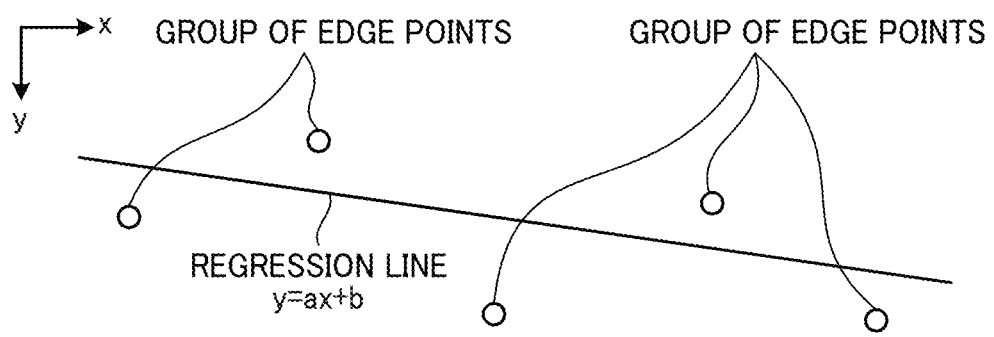
FIG. 12A and FIG. 12B are diagrams each illustrating an example of a feature amount using one or more edges, according to one or more embodiments.
Figure 12B:
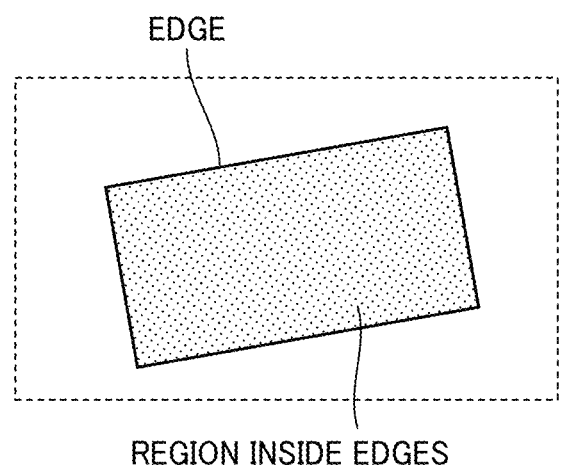

FIG. 12A and FIG. 12B are diagrams each illustrating an example of a feature amount using an edge (one or more edges, one or more edge portions), according to the present embodiment. The edge may not be extracted as a feature amount itself from the image, but the edge may be used to obtain the feature amount. Such examples include a regression line equation calculated from extracted edge point groups using the least squares method, and a region (a set of positions) inside the edges, as illustrated in FIG. 12A and FIG. 12B, respectively. As for the regression line equation, there is a method of obtaining a single line equation based on all edge information for each side. In addition to that, there is another method of dividing the edge into a plurality of regions to calculate a plurality of line equations and selecting a representative one among the plurality of line equations or combining ones among the plurality of line equations. In the latter method, as a method of deriving a final line equation, a straight line, of which the inclination has a median value, is obtained or an average value of the plurality of the line equations is obtained, for example.

Figure 13:
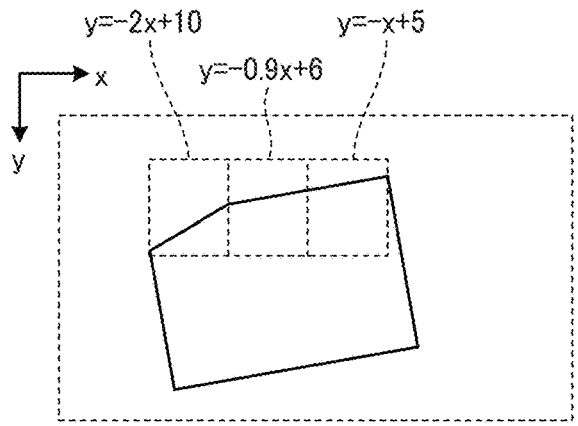
FIG. 13 is a diagram illustrating selection of a line equation in a regression line equation, according one or more embodiments.

FIG. 13 is a diagram illustrating selection of a line equation in the regression line equation, according to the present embodiment. By dividing an edge into a plurality of regions to calculate the plurality of line equations and selecting a representative one or combining representative ones among the plurality of line equations, the inclination of the document 12, which is the subject, is correctly recognizable even in a case where a corner of the document 12, which is the subject, is missing, as illustrated in FIG. 13.

As the processing described above, the feature amount detection unit 201 extracts the one or more edges of the document 12, which is the subject, as a feature amount, thereby detecting the region of the document 12, which is the subject.

Next, a description is given of size detection of the document 12, which is the subject.

Figure 14:
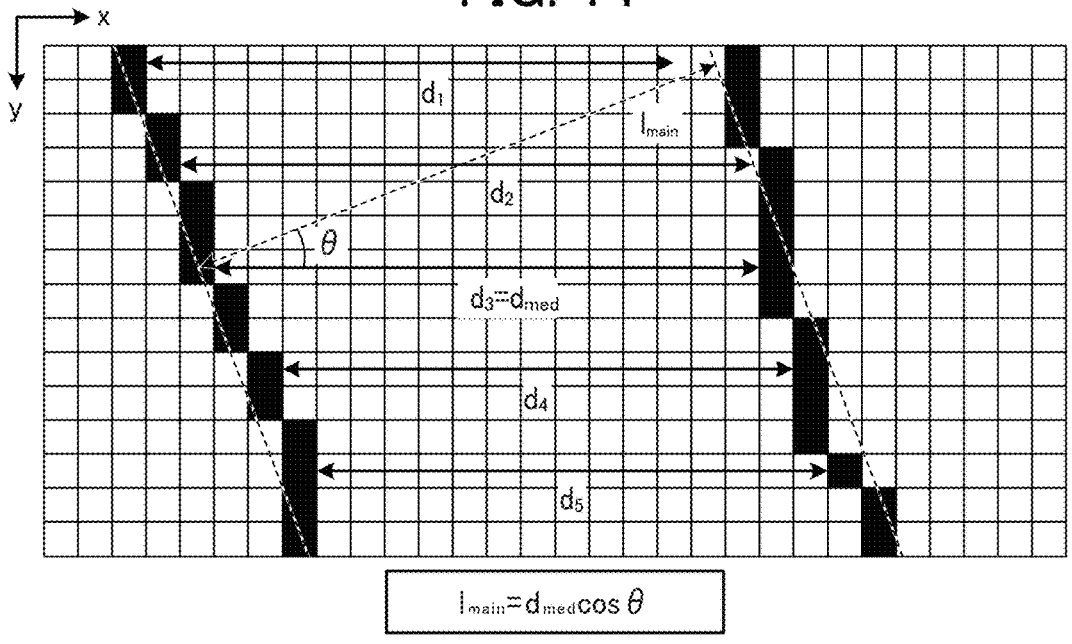
FIG. 14 is a diagram illustrating an example of size detection (horizontal direction), according to one or more embodiments.

FIG. 14 is a diagram illustrating an example of size detection (horizontal direction), according to the present embodiment. As illustrated in FIG. 14, for representative positions in the vertical direction of the image, distances between the left side edge and the right side edge of the document 12, which is the subject, are obtained, and a size in the horizontal direction is calculated from the median value thereof and an inclination angle, which is calculated separately. In addition, a size in the vertical direction is calculated in substantially the same manner.

The size information detected in this way is usable for error detection or image correction processing, which is described later. Regarding the error detection, for example, in a case of scanning with a multifunction peripheral, when a size that is different from a document size set in advance by a user is detected, the user is notified to set a document of the correct size.

As described above, according to the present embodiment, with respect to the visible image or the invisible image, by detecting the feature amount of the document 12, which is the subject, and the background portion 13 from at least one of the visible image and the invisible image, information that is not obtainable from the visible image is obtainable from the invisible image, resulting in performing the stable edge detection between the document and the background regardless of the type of the document.

In addition, the imaging unit 22 receives the visible light and the invisible light that are reflected from the document 12, which is the subject, and captures the visible image and the invisible image. This allows the imaging unit 22 to read an image with a simple configuration.

In addition, since the invisible light and the invisible image are the infrared light and the infrared image, respectively, the image is readable with a simple configuration.

Second Embodiment

A description is now given of a second embodiment.

The second embodiment is different from the first embodiment in that the feature amount is extracted from each of the visible image and the invisible image, and selection or combination among the feature amounts extracted from both of the visible image and the invisible image are automatically performed. In the following description of the second embodiment, the description of the same parts as in the first embodiment will be omitted, and those different from the first embodiment will be described. In addition, in the description of the second embodiment, the elements, functions, processes, and steps that are the same or substantially the same as those described in the first embodiment are denoted by the same reference numerals or step numbers, and redundant descriptions thereof are omitted below.

Figure 15:
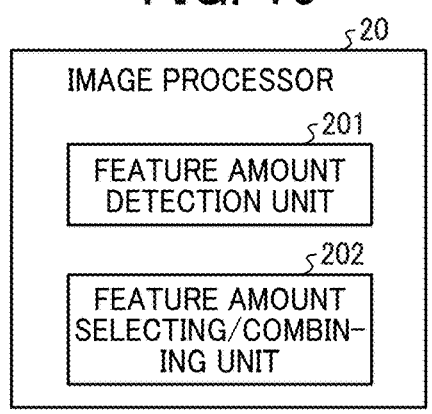
FIG. 15 is a block diagram illustrating a functional configuration of an image processor according to one or more embodiments.

FIG. 15 is a block diagram illustrating a functional configuration of an image processor according to the second embodiment. As illustrated in FIG. 15, the image processor 20 includes a feature amount selecting/combining unit 202 in addition to the feature amount detection unit 201.

As described above, the feature amount detection unit 201 detects, with respect to the visible image or the invisible image obtained by the imaging unit 22, the feature amount of the document 12, which is the subject, and the background portion 13, which is detected from at least one of the visible image and the invisible image.

The feature amount selecting/combining unit 202 selects one among or combines the feature amounts each detected from a corresponding image, based on the feature amount of the document 12, which is the subject, and the background portion 13, which is detected from at least one of the visible image and the invisible image by the feature amount detection unit 201.

More specifically, the feature amount selecting/combining unit 202 automatically performs the selection processing described with reference to FIG. 6. As a result, with respect to the document 12, which is the subject, a targeted feature amount which is failed to be extracted by the visible image alone or the invisible image alone, is obtainable by using the visible image and the invisible image in combination.

Figure 16:
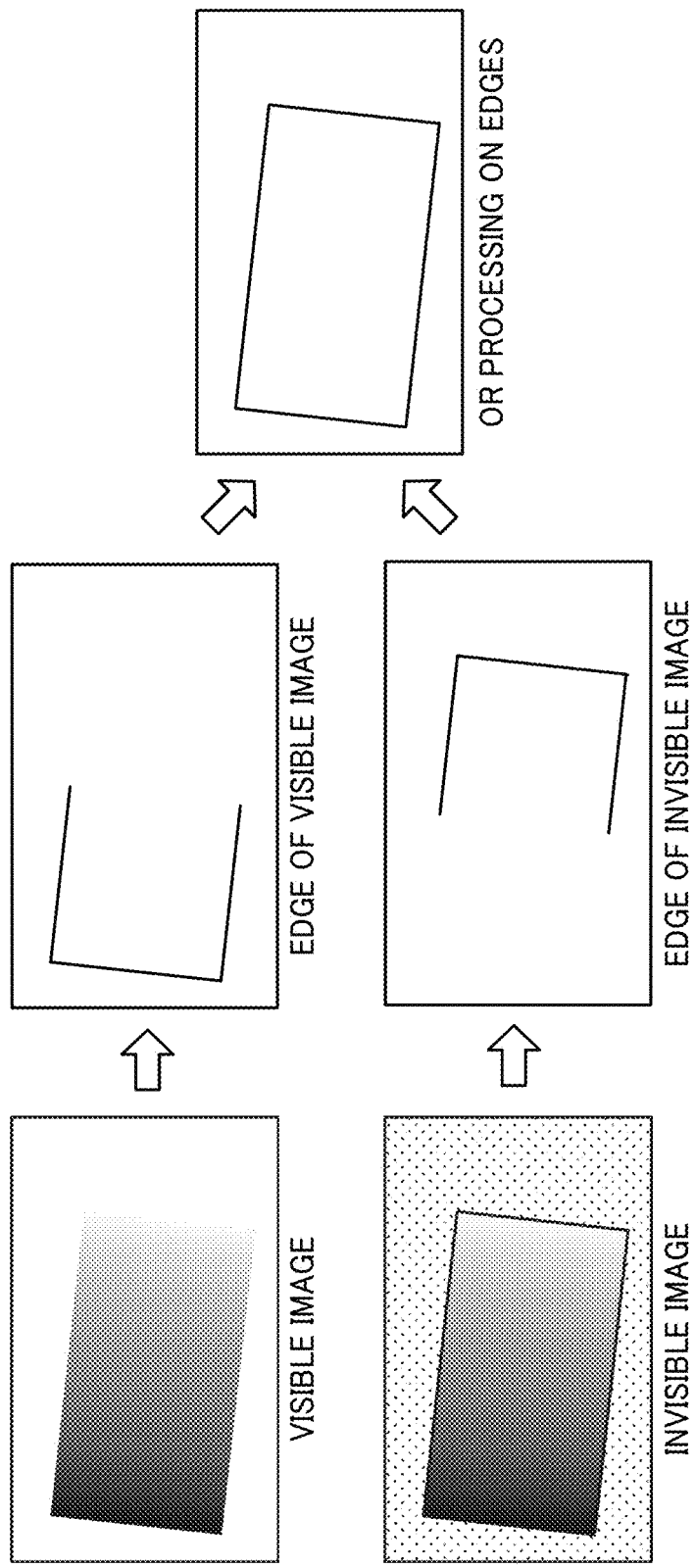
FIG. 16 is a diagram illustrating OR processing performed on edges, according to one or more embodiments.

FIG. 16 is a diagram illustrating OR processing performed on an edge (one or more edges, one or more edge portions) by the feature amount selecting/combining unit 202, according to the present embodiment. The feature amount selecting/combining unit 202 according to the present embodiment performs the OR processing on an edge when extracting, as the feature amount, the edge of the document 12, which is the subject.

By performing the OR processing for each edge extracted from the invisible image and the visible image, a portion where the edge is not able to be taken in one of the images is complemented by the other one of the images. For example, as illustrated in FIG. 16, in a case of a document having a gradation, an edge (edge portion) of the black region of the document is easy to be taken and an edge (edge portion) of the white region is difficult to be taken in the visible image. On the other hand, an edge (edge portion) of the white region of the document is easy to be taken and an edge (edge portion) of the black region is difficult to be taken in the invisible image. In the description, the edge detected from the invisible image may be referred to as a first edge, and the edge detected from the visible image may be referred to as a second edge.

Accordingly, the feature amount selecting/combining unit 202 combines the edge (edge portion) of the black region in the visible image and the edge (edge portion) of the white region in the invisible image to extract the edge of the entire document that is not obtained by one of the images alone.

In this way, the feature amount selecting/combining unit 202 performs the OR processing on the edges detected from the invisible image and the visible image to combine the edges. Accordingly, there is a portion where the edge is detectable in either the visible image or the invisible image, and thereby the edge between the document 12, which is the subject, and the background portion 13 is detectable in most of the portions of the edge, namely the number of edge detectable portions increases.

Next, a description is given of giving priority to the edge detected from the invisible image.

Figure 17A:
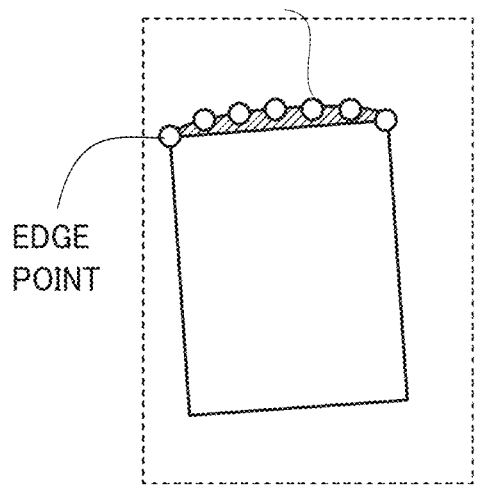
FIG. 17A and FIG. 17B are diagrams illustrating how edges in a visible image and an invisible image appear, according to one or more embodiments.
Figure 17B:
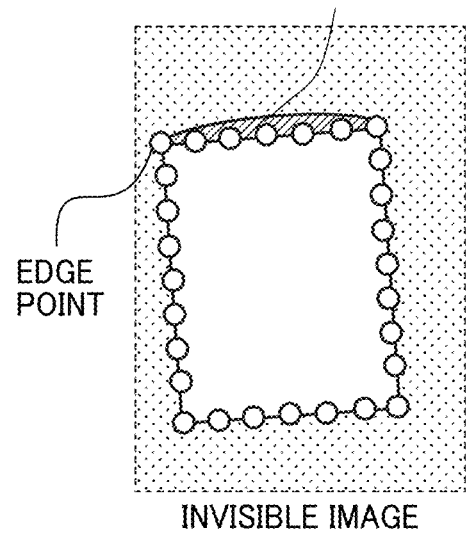

FIG. 17A and FIG. 17B are diagrams illustrating how edges in the visible image and the invisible image appear, according to the present embodiment. As illustrated in FIG. 17A, a shadow of the document 12, which is the subject, may be come out in the background of the visible image, and the edge is failed to be extracted linearly depending on a shape of the shadow. This may give an effect in detection accuracy of an inclination of the document 12, which is the subject. On the other hand, in an area where there is no shadow in the visible image, when the document 12, which is the subject, is white, there is a high possibility that the edge extraction, itself, is failed to be performed.

As illustrated in FIG. 17B, in the invisible image, especially when the background portion 13 includes an invisible light low reflection portion, the edge between the document 12, which is a subject and white, and the background portion 13 is easily extractable. Even in the invisible image, there may be a case where a shadow appears on the document 12, which is the subject. However, since the shadow is darker than the background, for example, when the edge is detected with a first order differential filter that filters in order "from a dark part to a bright part", the edge between the shadow and the document is obtainable, but not the edge between the shadow and the background. Alternatively, even when two types of first order differential filters are used to take the edges in order of both "from a dark part to a bright part" and "from a bright part to a dark part", if the brightness is close to that of the background portion 13, the edge between the shadow and the background portion 13 is not to be extracted. Accordingly, there is a high possibility that accuracy of the edge detection between the document 12, which is the subject, and the background portion 13 performed with the invisible image is higher than that performed with the visible image. Accordingly, the edge detection with the visible image may be performed when the edge detection with the invisible image is not performed normally.

Figure 18:
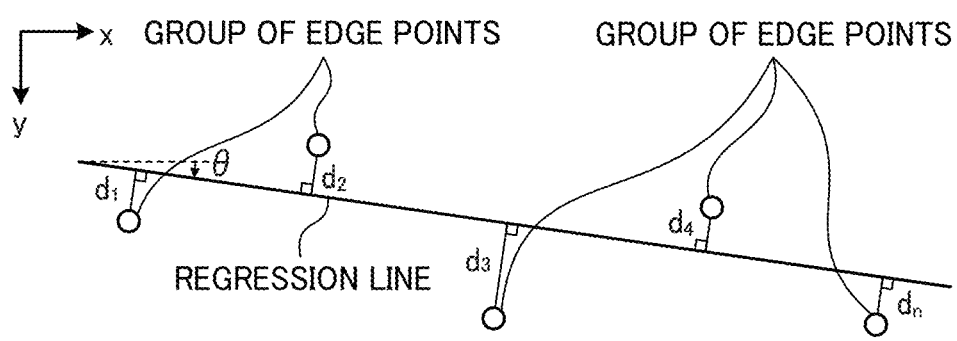
FIG. 18 is a diagram illustrating an example of a determination of an edge detection performed normally, according to one or more embodiments.

FIG. 18 is a diagram illustrating an example of a determination of the edge detection performed normally, according to the present embodiment. Criteria for "normally detect" may be that, for example, as illustrated in FIG. 18, when the obtained edge point groups are regressed with a straight line, a difference by the least squares method is equal to or less than a threshold value, or an inclination angle of the straight line is equal to or less than a threshold value. In addition, in the case of selecting/combining among the plurality of line equations as described above, the criteria for "normally detect" may include that the number of line equations normally determined is equal to or larger than a threshold value.

In this way, the feature amount selecting/combining unit 202 sets, in edge selection processing (selection processing related to the edge), the edge detected from the invisible image in a case where the edge is detected normally from the invisible image and sets the edge detected from the visible image in a case where the edge is not detected normally from the invisible image. In this case, with the invisible image, the edge is more likely to be detected and the detection accuracy is improved.

Next, a description is given of a case where the edge is not detected normally in both the visible image and the invisible image.

Figure 19A:
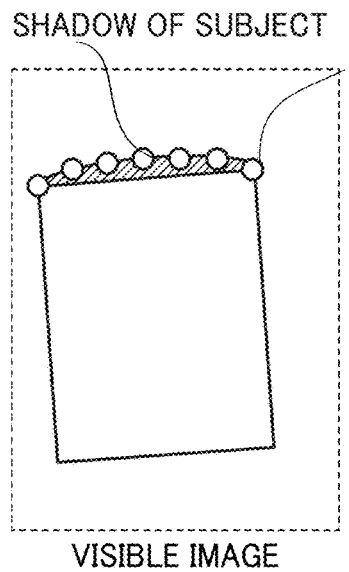
FIG. 19A, FIG. 19B, and FIG. 19C are diagrams illustrating an example of failure of OR processing performed on an edge, according to one or more embodiments.
Figure 19B:
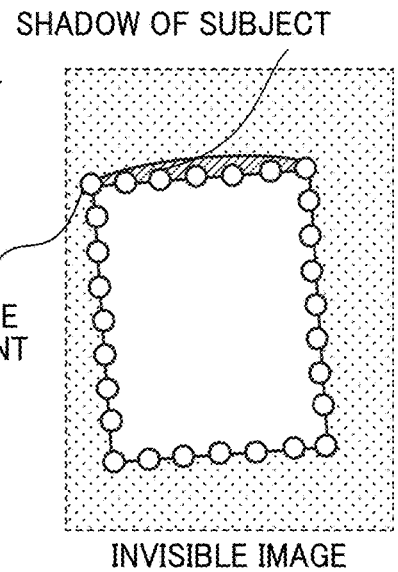
Figure 19C:
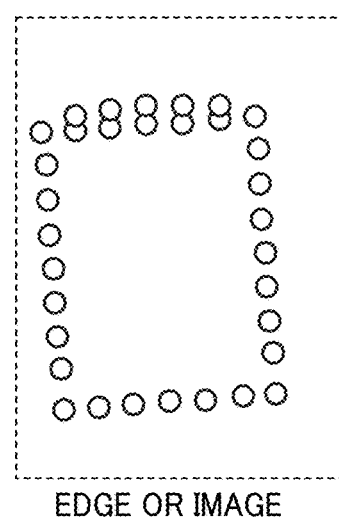

FIG. 19A, FIG. 19B, and FIG. 19C are diagrams illustrating an example of failure of the OR processing performed on edges, according to the present embodiment. When the OR processing is performed on the visible image and the invisible image, there is a possibility that an untargeted edge is extracted. For example, as illustrated in FIG. 19A to FIG. 19C, when an edge is extracted between a shadow of the document 12, which is the subject, and the background portion 13 in the visible image, the shadow of the document 12, which is the subject, remains after the OR processing is performed, and this gives an effect on the calculation of an inclination of the document. However, since there is an advantage that the number of edge detectable portions increases in a case of performing the OR processing, as described above, the feature amount detection unit 201 performs the OR processing when the edge detection is not normally performed in both the visible image and the invisible image.

As described above, the feature amount selecting/combining unit 202 performs the OR processing on the edge detected from the invisible image and the edge detected from the visible image in a case where neither the edge of the invisible image nor the edge of the visible image is not detected normally. How the edge appears may differ between the visible image and the invisible image due to a shadow of the document. Accordingly, the OR processing is performed when the edge is failed to be detected normally from each image.

Figure 20A:
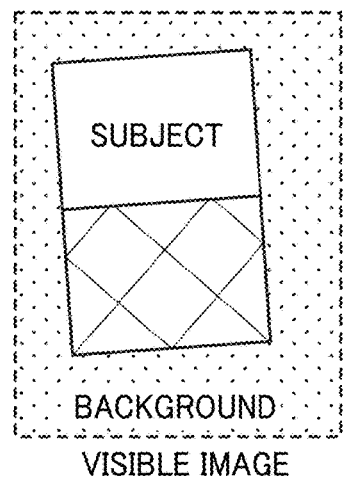
FIG. 20A and FIG. 20B are diagrams illustrating an example of a subject having a plurality of features mixed, according to one or more embodiments.
Figure 20B:
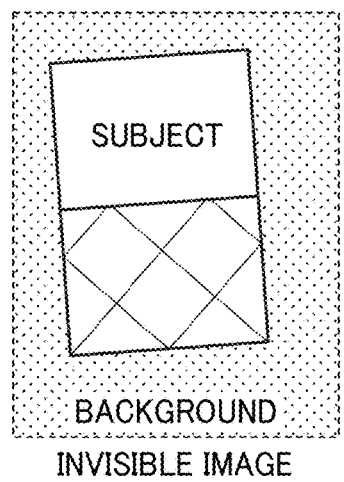

FIG. 20A and FIG. 20B are diagrams illustrating an example of a subject having a plurality of features mixed, according to the present embodiment. As illustrated in FIG. 20, for example, with the document 12, which is the subject, having a plurality of features mixed, a lower part of the document 12, which is the subject, is extracted from the visible image, and an upper part of the document 12, which is the subject, is extracted from the invisible image.

As described above, according to the present embodiment, with respect to the visible image or the invisible image, the feature amount of the document 12, which is the subject, and the background portion 13 is detected from at least one of the visible image and the invisible image, and the selection processing or the combination processing related the feature amount detected from each of the images is performed. As a result, the feature amount is automatically selected from one of the visible image and the invisible image, or the feature amount of the visible image and the feature amount of the invisible image are combined.

Third Embodiment

A description is now given of a third embodiment.

The third embodiment is different from the first embodiment and the second embodiment in including an image correction unit that corrects an image of a subject. In the following description of the third embodiment, the description of the same parts as in the first and second embodiments will be omitted, and those different from the first and second embodiments will be described. In addition, in the description of the third embodiment, the elements, functions, processes, and steps that are the same or substantially the same as those described in the first and second embodiments are denoted by the same reference numerals or step numbers, and redundant descriptions thereof are omitted below.

Figure 21:
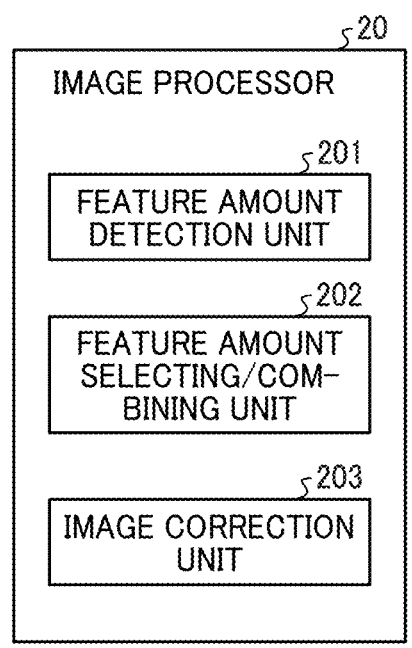
FIG. 21 is a block diagram illustrating a functional configuration of an image processor according to one or more embodiments.
Figure 22:
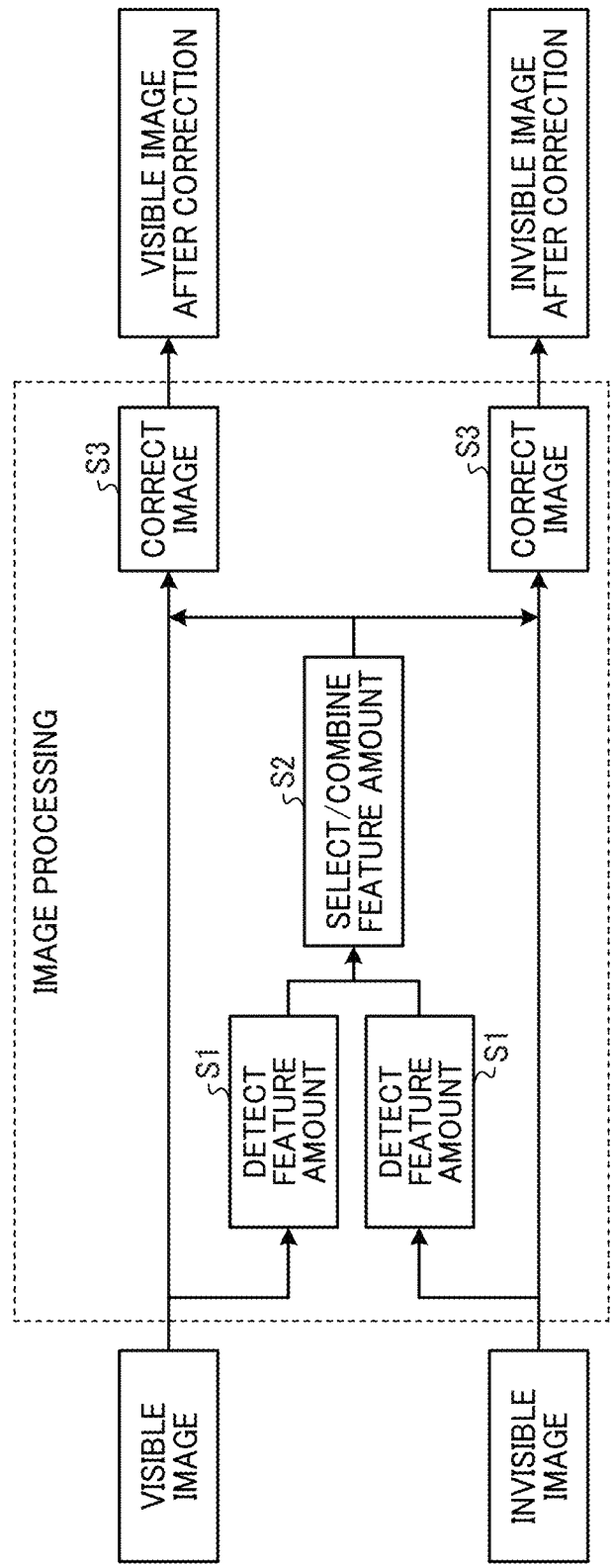
FIG. 22 is a flowchart illustrating operation performed by an image processor according to one or more embodiment.

FIG. 21 is a block diagram illustrating a functional configuration of an image processor according to the third embodiment. FIG. 22 is a flowchart illustrating operation performed by the image processor according to the third embodiment. As illustrated in FIG. 21, the image processor 20 includes an image correction unit 203 in addition to the feature amount detection unit 201 and the feature amount selecting/combining unit 202.

As illustrated in FIG. 22, the feature amount detection unit 201 detects, with respect to a visible image or an invisible image obtained by the imaging unit 22, a feature amount of the document 12, which is the subject, and the background portion 13, which is detected from at least one of the visible image and the invisible image (Step S1).

As illustrated in FIG. 22, based on the feature amount of the document 12, which is the subject, and the background portion 13, which is detected from at least one of the visible image and the invisible image by the feature amount detection unit 201, the feature amount selecting/combining unit 202 selects one among or combines the feature amounts each of which is detected from one of the visible image and the invisible image (Step S2).

As illustrated in FIG. 22, the image correction unit 203 performs image correction for each of the visible image and the invisible image by using a result obtained by combination processing performed by the feature amount selecting/combining unit 202 (Step S3). An example of the image correction is given later.

Figure 23:
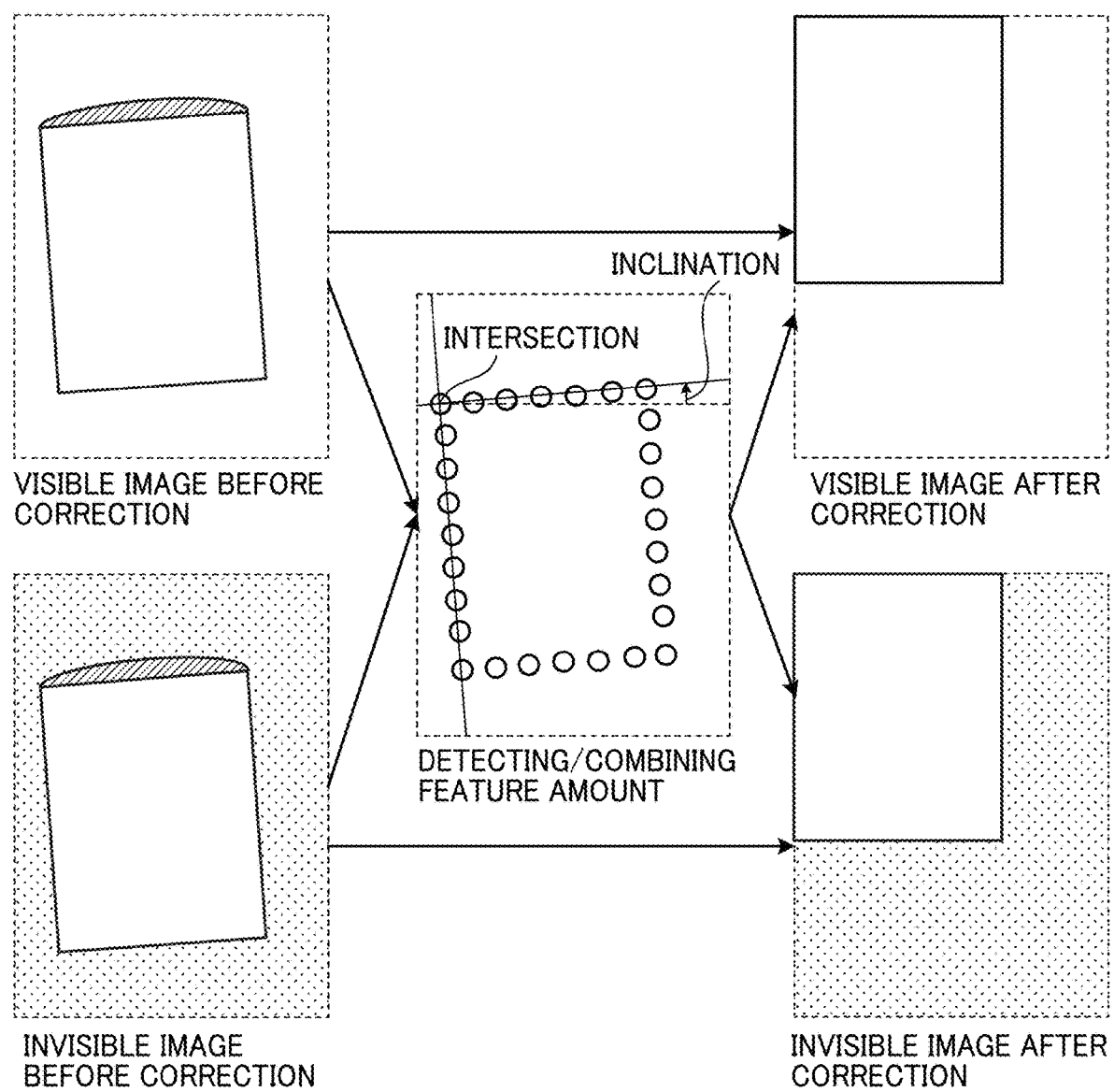
FIG. 23 is a diagram illustrating an example of correcting an inclination and a position of a subject, according to one or more embodiments.

FIG. 23 is a diagram illustrating an example of correcting an inclination and a position of the subject, according to the present embodiment. In the example illustrated in FIG. 23, the image correction unit 203 corrects the inclination and the position of the document 12, which is the subject, by the feature amount detected by the feature amount selecting/combining unit 202.

Regarding the correction of the inclination of the document 12, which is the subject, the image correction unit 203 uses a method in which an inclination is obtained after the edge point groups, each of which is extracted from a side of the document 12, which is the subject, are regressed with a straight line, as described above, and then the entire image is rotated based on the obtained inclination.

Regarding the correction of a position of the document 12, which is the subject, the image correction unit 203 uses a method in which a position (point) of an intersection of the regression lines of the edge point groups of the upper side and the left side of the document 12, which is the subject, is obtained, and then the point, which is the intersection, is moved to the origin.

Figure 24A:
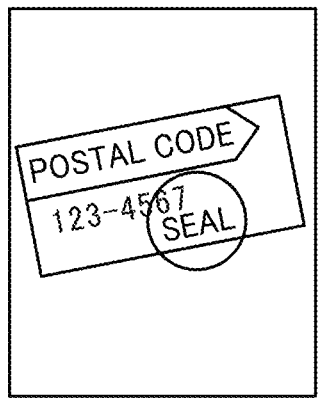
FIG. 24A to FIG. 24D are diagrams illustrating examples of use of an invisible image, according to one or more embodiments.
Figure 24B:
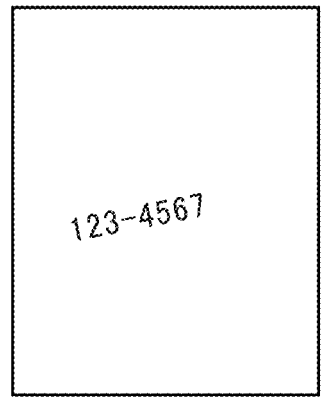
Figure 24C:
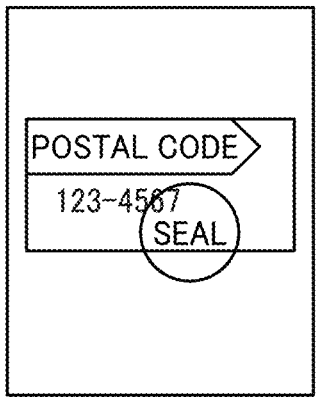
Figure 24D:
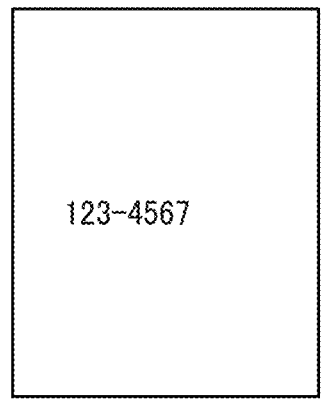

FIG. 24A to FIG. 24D are diagrams illustrating examples of use of the invisible image, according to the present embodiment. By correcting an image based on a result obtained by the combination processing performed by the feature amount selecting/combining unit 202, effects including improvement in visibility of pictures or characters in a document region are obtained. In addition, the reflectance of the invisible component is remarkably different from that of the visible component depending on the coloring material, and as a result, colors may be skipped (diluted) to be removed as illustrated in FIG. 24B and FIG. 24D. By utilizing skipping the colors, processing of optical character recognition (OCR) or the like may be performed in a subsequent processing stage, accordingly. Therefore, there is an advantage that correcting the invisible image in addition to the visible image contributes to improve OCR accuracy.

As described above, by correcting the inclination and the position of the document 12, which is the subject, based on a result of the edge detection, the document 12, which is the subject, is corrected to be easily viewable. In addition, there is a possibility that the OCR accuracy and the like improve.

Figure 25:
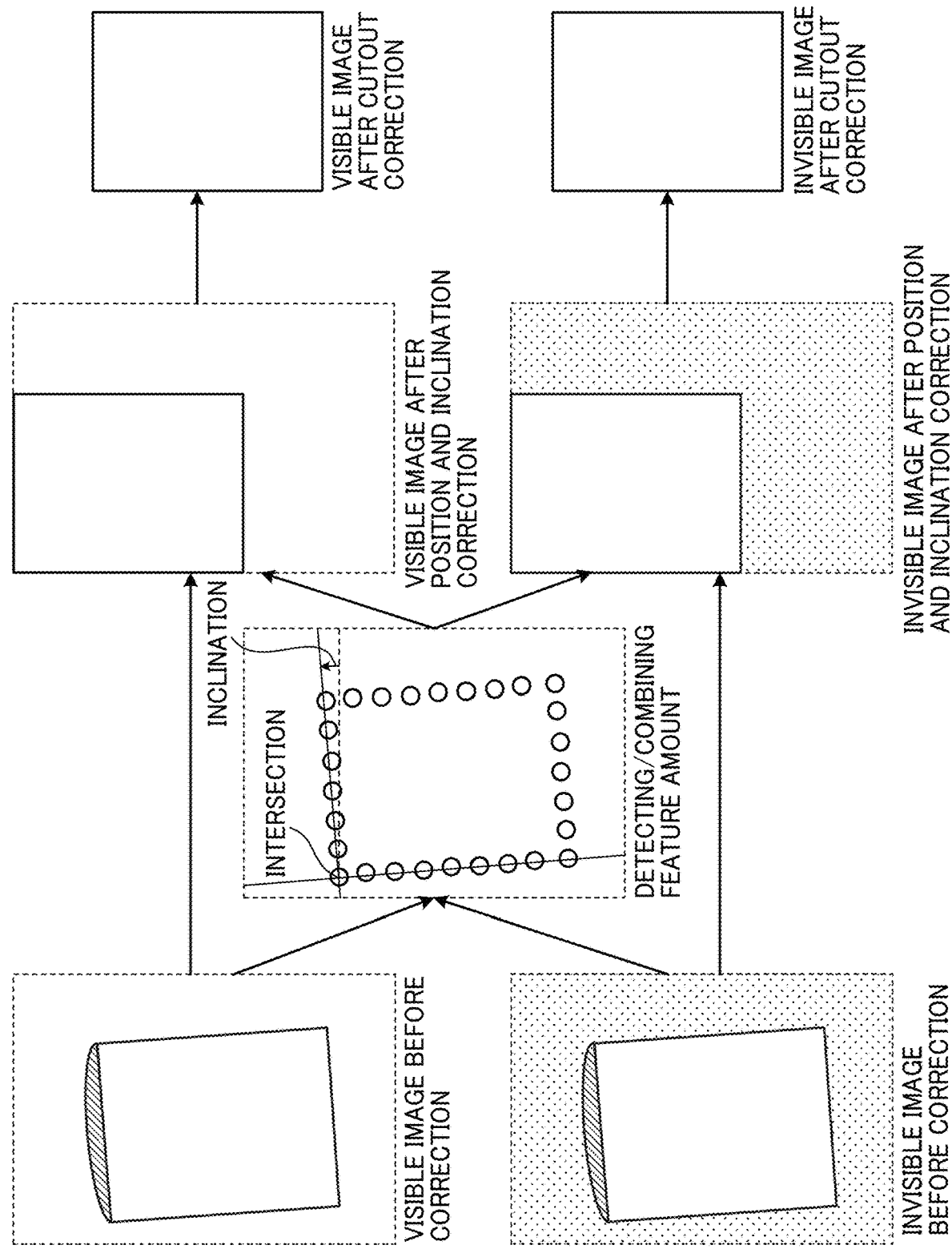
FIG. 25 is a diagram illustrating an example of correcting an inclination and a position of a subject and cutting out the subject, according to one or more embodiments.

FIG. 25 is a diagram illustrating an example of correcting an inclination and a position of a subject and cutting out the subject, according to the present embodiment. As illustrated in FIG. 25, the image correction unit 203 cuts out a region of the document 12, which is the subject, in a just size by combining the inclination correction and the position correction, which are described above. Even when the feature amount is not detected correctly and the inclination or the position is not corrected, the subject is able to be cut out, though the size is not the just size.

Figure 26:
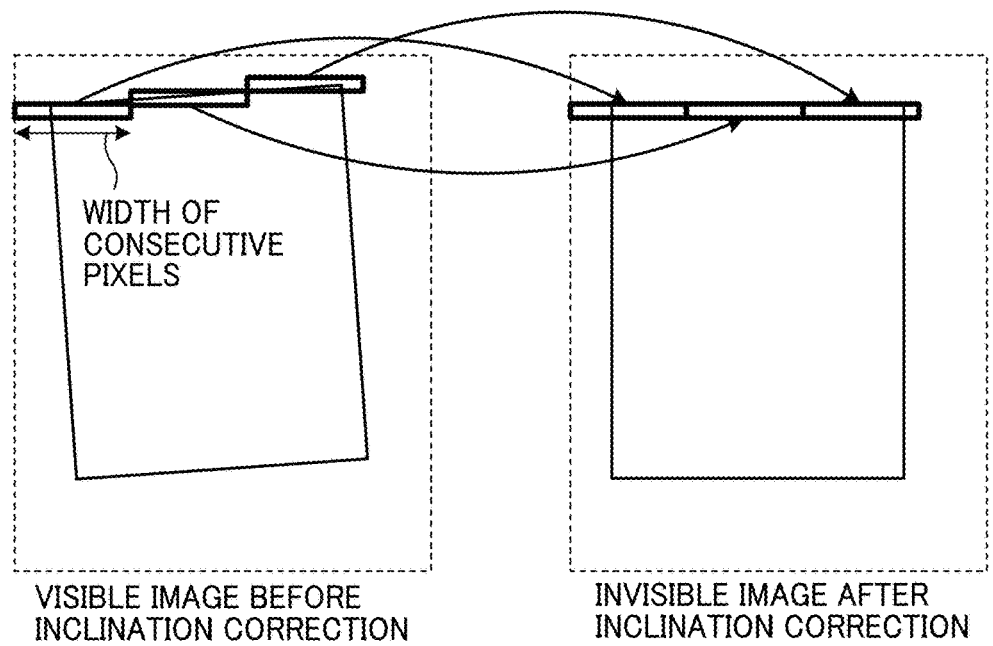
FIG. 26 is a diagram illustrating an example of inclination correction, according to one or more embodiments.

FIG. 26 is a diagram illustrating an example of inclination correction, according to the present embodiment. In a case of image processing performed by hardware, as an example in which the inclination correction is failed to be performed, as illustrated in FIG. 26, consecutive pixels in the image are required to be collectively replaced, with equal to or more than a minimum width for the convenience of processing speed. However, it is difficult to correct an inclination when the inclination is too large. In such a case, instead of the inclination correction, it may be desired to delete a region of the background portion 13 as much as possible.

In this case, for example, the image correction unit 203 may perform processing such as, if a rightmost edge point is identified, a region in the right side of the edge point is outside of the document 12, which is the subject, so that the region is deleted from the image.

Figure 27:
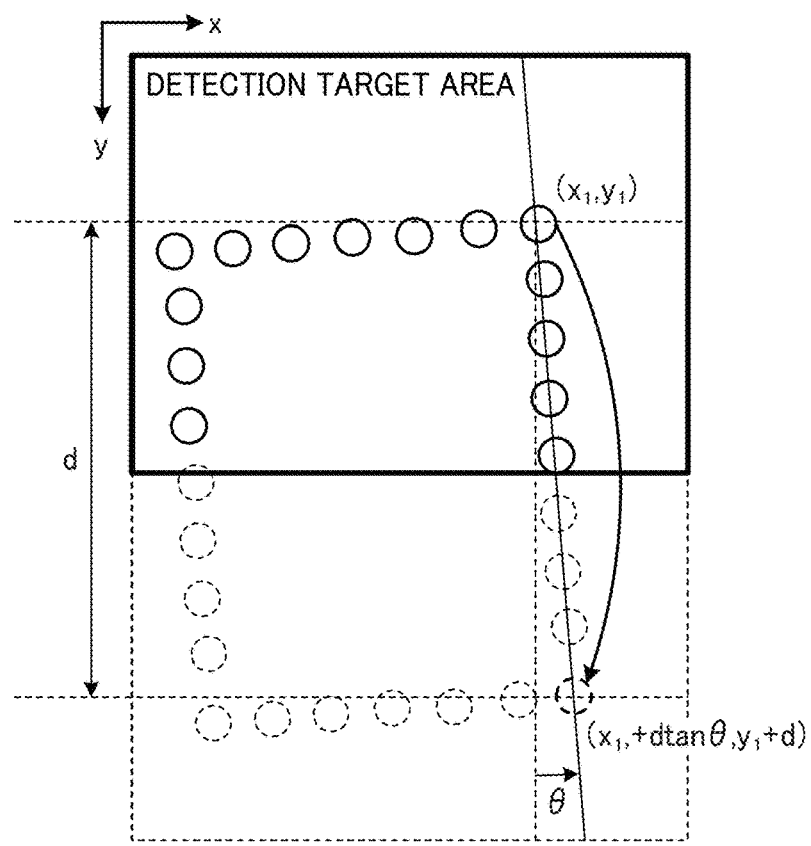
FIG. 27 is a diagram illustrating processing for identifying a rightmost edge point, according to one or more embodiments.

FIG. 27 is a diagram illustrating processing for identifying a rightmost edge point, according to the present embodiment. Even in a case where the edge extraction is able to be performed on only a part of the image due to an amount of memory, information on a size in the vertical direction, which may be obtained by, for example, sensor information in transferring the document, is enough for the processing. In this case, as illustrated in FIG. 27, the image correction unit 203 calculates the rightmost edge point from the edge pixels in the region by using information including the inclination information. The same applies to cases of an uppermost edge, a leftmost edge, and a lowermost edge, in addition to the rightmost edge.

The image correction unit 203 deletes an unnecessary region of the background portion 13 by cutting out the region of the document 12, which is the subject. As a result, in the image forming apparatus 100 such as a multifunction peripheral, there are effects obtained, for example, work performed by a user to input a size of the document 12, which is the subject, is reduced, the appearance of the image is improved, the storage area of the image storage destination is saved, and a size of the recording paper is reduced and the consumption of ink and toner is reduced in copying the image.

As described above, by automatically detecting and cutting out the size of the document 12, which is the subject, from the image based on the edge, the work of the user to input the document size is reduced (in particular, in a case of an irregular size). In addition, effects such as improving the appearance of the image, saving the storage area of the image storage destination, and reducing the size of the recording paper and reducing the consumption of ink and toner in copying the image are obtained.

As described above, according to the present embodiment, the image correction unit 203 corrects at least one of the visible image and the invisible image, resulting in improving the visibility of the image.

Note that in the embodiments described above, the image processing apparatus is applied to an MFP having at least two of copying, printing, scanning, and facsimile functions. Alternatively, the image processing apparatus may be applied to any image forming apparatus such as for example, a copier, a printer, a scanner, or a facsimile machine.

Figure 28A:
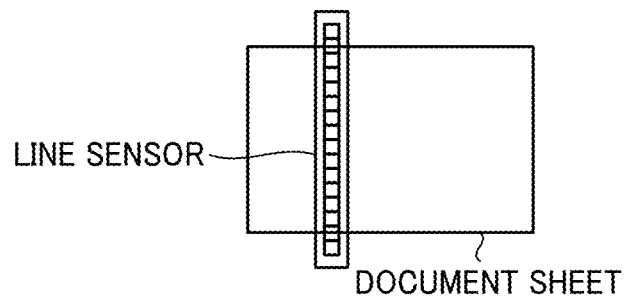
FIG. 28A to FIG. 28C are diagrams each illustrating a modified example of the image processing device, according to one or more embodiments.

In each of the above embodiments, the image reading device 101 of the image forming apparatus 100 is applied as the image processing apparatus, but the present disclosure is not limited to this. The definition of the image processing apparatus is any apparatus or device that is able to acquire a reading level without reading as an image, such as a line sensor of the same magnification optical system (contact optical system: contact image sensor (CIS) type) illustrated in FIG. 28A. A device illustrated in FIG. 28A reads information on a plurality of lines by moving a line sensor or a document.

Figure 28B:
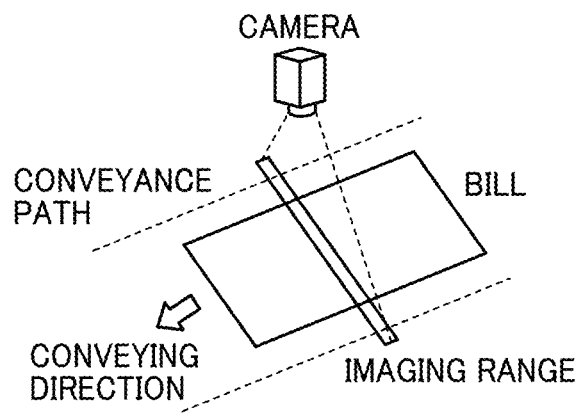
Figure 28C:
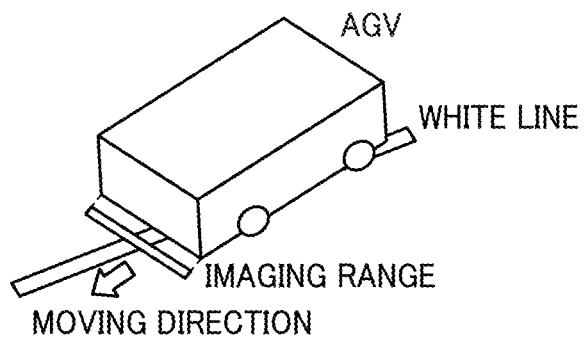

Further, the image processing apparatus is applicable to a bill conveying device as illustrated in FIG. 28B, a white line detection device of an automatic guided vehicle (AGV) as illustrated in FIG. 28C, and the like.

A subject of the bill conveying device illustrated in FIG. 28B is a bill (a piece of paper money). A feature amount detected by the bill conveying device is used for correcting an image itself, for example. That is, the bill conveying device illustrated in FIG. 28B recognizes an inclination of the bill by edge detection, and performs skew correction using the recognized inclination.

A subject of the white line detection device of the automatic guided vehicle illustrated in FIG. 28c is a white line. A feature amount output by the white line detection device of the automatic guided vehicle is usable for determining a moving direction of the automatic guided vehicle. That is, the white line detection device of the automatic guided vehicle recognizes an inclination of a white line region by edge detection and determines a moving direction of the automatic guided vehicle using the recognized inclination. Further, the white line detection device of the automatic guided vehicle is able to correct the moving direction according to a position or an orientation of the automatic guided vehicle in a later process. For example, the automatic guided vehicle is able to stop driving when a white line having a thickness different from a predetermined thickness is detected.

According to a conventional art, although an infrared light low reflection portion is provided as a background, and edge detection of detecting an edge between a document and a background is performed based on an acquired infrared image, there is an issue that the edge detection is not successfully performed depending on a color of the document.

In view of the above-described issue, an object of one or more embodiments of the present disclosure is to achieve stable edge detection of detecting an edge between a document and a background regardless of a type of the document.

According to one or more embodiments of the present disclosure, there is an effect that stable edge detection of detecting an edge between a document and a background is able to be performed regardless of a type of the document.

Any one of the above-described operations may be performed in various other ways, for example, in an order different from the one described above.

Each of the functions of the described embodiments may be implemented by one or more processing circuits or circuitry. Here, the "processing circuit or circuitry" in the present disclosure includes a programmed processor to execute each function by software, such as a processor implemented by an electronic circuit, and devices, such as an application specific integrated circuit (ASIC), a digital signal processors (DSP), a field programmable gate array (FPGA), and conventional circuit modules arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A reading device, comprising:
a light source that irradiates visible light and invisible light to a subject;
an image sensor configured to receive the visible light and the invisible light, each of which is reflected from the subject, to capture a visible image and an invisible image;
a background board provided in an image capturing range of the image sensor; and
an image processing circuitry configured to detect a feature amount of the subject and the background board from the visible image and the invisible image, wherein
the image processing circuitry detects an edge of the subject as the feature amount, the edge being at least one of a first edge from the invisible image or a second edge detected from the visible image.

2. The reading device, according to claim 1, wherein
the light source irradiates infrared light as the invisible light, and
the image sensor captures an infrared image as the invisible image.

3. The reading device, according to claim 1, wherein the image processing circuitry performs selection processing or combination processing depending on at least one of the feature amount detected from the visible image or the feature amount detected from the invisible image.

4. The reading device, according to claim 1, wherein
the image processing circuitry compares, with respect to the invisible light and the visible light, differences in spectral reflection characteristics between the background board and the subject, and
the feature amount detected from the visible image includes a component having a largest difference from the invisible light among a plurality of components of the visible light.

5. The reading device, according to claim 1, wherein the background board includes an invisible light low reflection portion that diffusely reflects the visible light and reflects the invisible light at a reflectance lower than the reflectance of the visible light.

6. The reading device, according to claim 1, wherein the image processing circuitry performs OR processing on the first edge detected from the invisible image and the second edge detected from the visible image to combine the first edge and second edge.

7. The reading device, according to claim 1, wherein
in a case where the first edge is detected normally from the invisible image, the image processing circuitry selects the first edge, and
in a case where the first edge is not detected normally from the invisible image, the image processing circuitry selects the second edge.

8. The reading device, according to claim 1, wherein in a case where the image processing circuitry fails to normally detect the first edge from the invisible image and the second edge from the visible image, the image processing circuitry performs OR processing on the first edge and the second edge to combine the first edge and second edge.

9. The reading device, according to claim 1, wherein the image processing circuitry detects a size of the subject based on the edge.

10. The reading device, according to claim 1, wherein the image processing circuitry corrects an inclination and a position of the subject based on the edge.

11. The reading device, according to claim 1, wherein the image processing circuitry cuts out the subject based on the edge.

12. The reading device, according to claim 1, wherein the image processing circuitry corrects at least one of the visible image or the invisible image.

13. An image processing apparatus, comprising:
the reading device according to claim 1; and
an image forming device provided below the reading device and configured to form an image.

14. The reading device, according to claim 1, wherein
the subject is a document, and
the first type is a first type of document.

15. The reading device according to claim 14, wherein the first type is a first type of paper.

16. The reading device according to claim 14, wherein
the image processing circuitry is configured to detect the feature amount of the subject and the background board from the invisible image in a case that the subject is of a second type different from the first type, and
the second type is a second type of document.

17. The reading device, according to claim 1, wherein the image processing circuitry is further configured to set the first type prior to the image sensor capturing the visible image and the invisible image.

18. A method of detecting a feature amount, comprising:
receiving, by an image sensor, visible light and invisible light that is irradiated from a light source and reflected from a subject to capture a visible image and an invisible image; and
detecting a feature amount of the subject and a background board from the visible image and the invisible image, the background board being provided in an image capturing range of the image sensor, wherein
the detecting includes detecting an edge of the subject as the feature amount, the edge being at least one of a first edge from the invisible image or a second edge detected from the visible image.

19. A non-transitory recording medium storing a plurality of executable instructions which, when executed by a processor, cause the processor to:
control an image sensor to receive visible light and invisible light that is irradiated from a light source and reflected from a subject to capture a visible image and an invisible image; and
detect a feature amount of the subject and a background board from the visible image and the invisible image, the background board being provided in an image capturing range of the image sensor, wherein
detection of the feature amount includes detecting an edge of the subject as the feature amount, the edge being at least one of a first edge from the invisible image or a second edge detected from the visible image.

* * * * *